United States Patent
Arai et al.

(10) Patent No.: US 10,472,723 B2
(45) Date of Patent: Nov. 12, 2019

(54) METHOD OF PREVENTING REVERSE CURRENT FLOW THROUGH AN ION EXCHANGE MEMBRANE ELECTROLYZER

(71) Applicant: thyssenkrupp Uhde Chlorine Engineers (Japan) Ltd., Tokyo (JP)

(72) Inventors: Kazuyuki Arai, Tamano (JP); Yoshinari Take, Tamano (JP); Terumi Hashimoto, Tamano (JP); Takaaki Matsuo, Tamano (JP); Toshikazu Hayashida, Tamano (JP)

(73) Assignee: THYSSENKRUPP UHDE CHLORINE ENGINEERS (JAPAN) LTD., Tokyo (JP)

( * ) Notice: Subject to any disclaimer, the term of this patent is extended or adjusted under 35 U.S.C. 154(b) by 375 days.

(21) Appl. No.: 14/590,166

(22) Filed: Jan. 6, 2015

(65) Prior Publication Data
US 2016/0194769 A1    Jul. 7, 2016

(51) Int. Cl.
C25B 9/00    (2006.01)
C25B 9/16    (2006.01)
(Continued)

(52) U.S. Cl.
CPC .............. C25B 15/02 (2013.01); C25B 1/04 (2013.01); C25B 1/26 (2013.01); C25B 9/08 (2013.01); C25B 15/08 (2013.01); *Y02E 60/366* (2013.01)

(58) Field of Classification Search
CPC .... C25C 1/00; C25C 7/04; C25C 7/00; C25B 9/00; C25B 9/08; C25B 15/00; C25B 9/16
(Continued)

(56) References Cited

U.S. PATENT DOCUMENTS 3,481,851 A * 12/1969 Lancy ............... B01D 61/44
                                                  205/486
5,015,345 A    5/1991 Traini et al.
(Continued)

FOREIGN PATENT DOCUMENTS

EP    1 067 217 A1    1/2001
JP    55-58383 A    5/1980
(Continued)

OTHER PUBLICATIONS

Japanese Office Action, dated Jun. 2, 2015, for Japanese Application No. 2012-241093.

*Primary Examiner* — Zulmariam Mendez
(74) *Attorney, Agent, or Firm* — Birch, Stewart, Kolasch & Birch, LLP

(57)    ABSTRACT

Provided is a method of preventing reverse current flow through an ion exchange membrane electrolyzer, which method is capable of preventing a reverse current from being generated after stopping operation of the ion exchange membrane electrolyzer.

A method of preventing reverse current flow through an ion exchange membrane electrolyzer 100, the ion exchange membrane electrolyzer 100 having an anode chamber 107 housing an anode, a cathode chamber 110 housing a cathode, an anode solution-supplying manifold 121 to feed anode solution to the anode chamber 107, and a cathode solution-supplying manifold 124 to feed cathode solution to the cathode chamber 110. After stopping operation of the ion exchange membrane electrolyzer 100, injected is a low electrical conductivity material with an electrical conductivity lower than that of the anode solution or the cathode solution to at least one of an anode solution-supplying pipe 127 which supplies the anode solution to the anode solution-supplying manifold 121 from an anode solution tank 123 and a cathode solution-supplying pipe 128 which supplies (Continued)

the cathode solution to the cathode solution-supplying manifold 124 from a cathode solution tank 123.

12 Claims, 4 Drawing Sheets

(51) Int. Cl.
      *C25B 15/00*       (2006.01)
      *C25D 17/00*       (2006.01)
      *C25C 1/00*       (2006.01)
      *C25B 15/02*       (2006.01)
      *C25B 15/08*       (2006.01)
      *C25B 1/04*       (2006.01)
      *C25B 1/26*       (2006.01)
      *C25B 9/08*       (2006.01)

(58) Field of Classification Search
      USPC .......................................................... 204/237
      See application file for complete search history.

(56) References Cited

U.S. PATENT DOCUMENTS

2007/0099040 A1*   5/2007  Morita .............. H01M 8/04231
                                                          429/429
2013/0153411 A1    6/2013  Ishimaru

FOREIGN PATENT DOCUMENTS

| JP | 59-23888 A | 2/1984 |
|----|------------|--------|
| JP | 60-221595 A | 11/1985 |
| JP | 62-13589 A | 1/1987 |
| JP | 2-502656 A | 8/1990 |
| JP | 8-144079 A | 6/1996 |
| JP | 10-99861 A | 4/1998 |
| JP | 2001-20089 A | 1/2001 |
| JP | 2011-190534 A | 9/2011 |
| JP | 5006456 B2 | 6/2012 |
| JP | 2012-158775 A | 8/2012 |
| JP | 2014-91838 A | 5/2014 |

\* cited by examiner

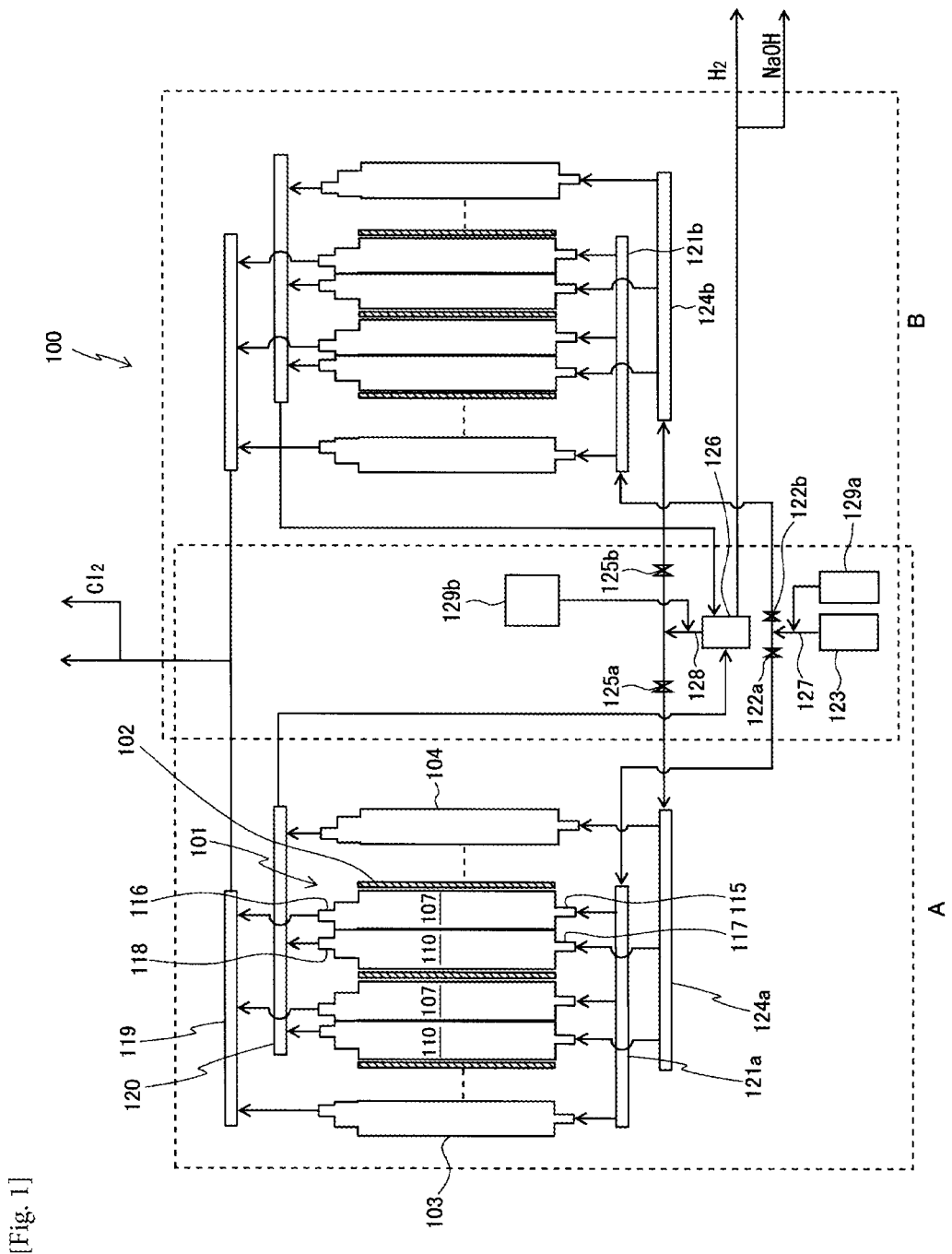
[Fig. 1]

[Fig.2]
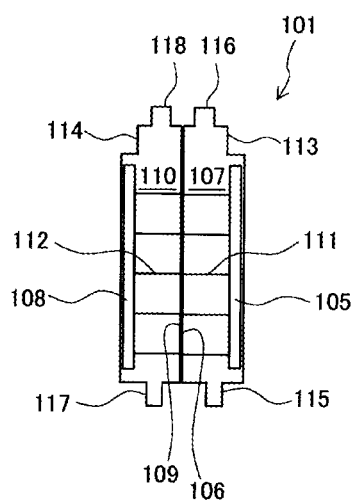

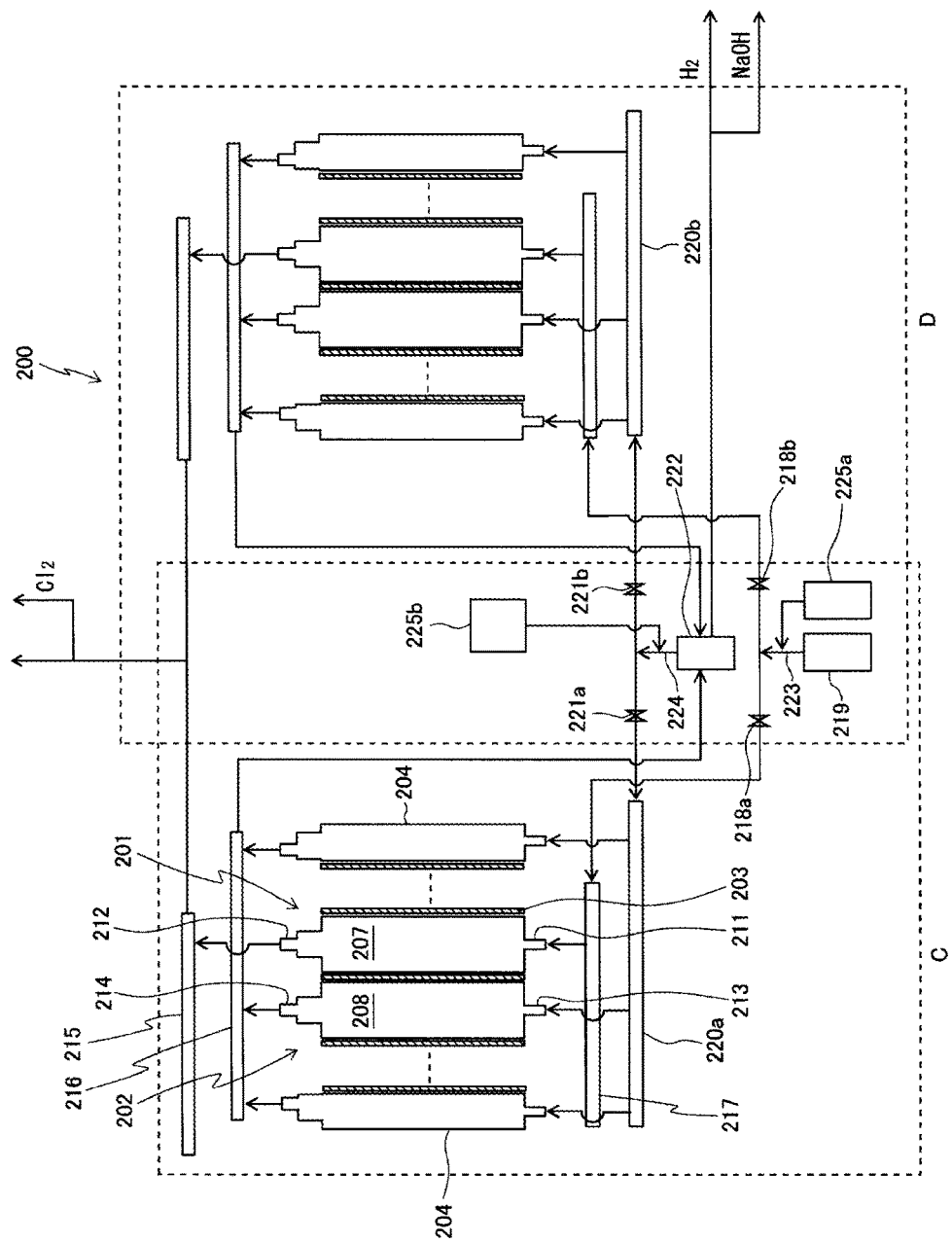
[Fig. 3]

[Fig.4]
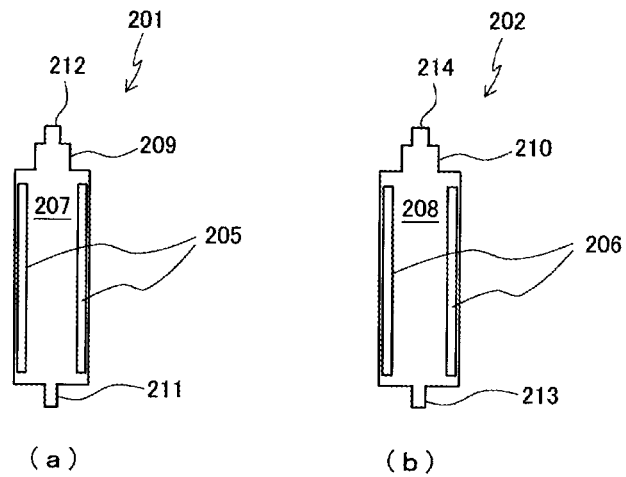
(a)　　　　(b)
[Fig.5]
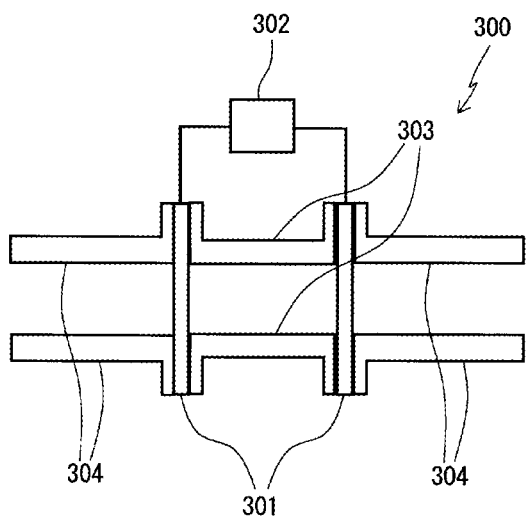

METHOD OF PREVENTING REVERSE CURRENT FLOW THROUGH AN ION EXCHANGE MEMBRANE ELECTROLYZER

TECHNICAL FIELD

The present invention relates to a method of preventing reverse current flow through an ion exchange membrane electrolyzer (hereinafter, also referred simply as "electrolyzer"), and, in particular, a method of preventing reverse current flow through an ion exchange membrane electrolyzer, which method is capable of preventing a reverse current from being generated after stopping operation of the ion exchange membrane electrolyzer.

BACKGROUND ART

A bipolar-type ion exchange membrane electrolyzer is currently known as an ion exchange membrane electrolyzer, in which bipolar elements each integrating with an anode chamber harboring an anode on one surface and a cathode chamber harboring a cathode on the other surface are arranged side by side with an ion exchange membrane interposed between the bipolar elements. In this type of electrolyzers, an electrolyzer is composed of tens of bipolar elements arranged in series with an ion exchange membrane interposed between the respective bipolar elements and plural electrolyzers of this type are electrically interconnected and the resulted electrolyzer system is operated.

A leakage current flows through the laying pipe of each bipolar element, while electrolytes are circulating through pipes for supplying anode solution and for supplying cathode solution and pipes for discharging anode solution and for discharging cathode solution in operation of an electrolyzer. In the electrolysis of brine, for example, an electromotive force is induced across an intervening ion exchange membrane in a unit cell after stopping operation of an electrolyzer by virtue of an active material in an anode solution inside an anode chamber, chlorine ($Cl_2$), and an active material in a cathode solution inside a cathode chamber, hydrogen ($H_2$), and a leakage current flows through laying pipes while stopping the operation as well as while running the operation. Therefore, an electrical current (reverse current) flows in the electrolyzer in a direction opposite to that of current flow during positive electrolysis. A variety of measures are adopted with the aim to reduce reverse current flow, because these reverse currents result in performance degradation in an electrolyzer, such as degradation of a cathode and the like.

A technology has been proposed as a general procedure to prevent a reverse current, for example, in Patent Document 1, in which brine is injected in an anode chamber to eliminate an active material inside the anode chamber, chlorine ($Cl_2$), after stopping operation of a brine electrolyzer. According to this procedure, the concentration of the active material in the electrolyte is decreased and the electromotive force to generate a reverse current is thereby reduced. Moreover, the temperature of the electrolyte is involved as a cause of enhancement in electromotive force to generate a reverse current. An electromotive force to generate a reverse current is reduced as the temperature of the electrolyte is decreased, in particular, to around room temperature, thus the temperature of electrolyzer is preferably low, and the injection of brine to the anode chamber also serves to reduce the temperature of the electrolyte. Furthermore, Patent Document 2 proposes a technology as a method of discharging a residual voltage in a water electrolysis cell, in which residual oxygen ($O_2$) in an anode chamber and residual hydrogen ($H_2$) in a cathode chamber are eliminated by continuing supply of an electrolyte, i.e., pure water to both the anode and cathode chambers.

Patent Document 3 proposes a technology as another technique with the aim to reduce reverse current flow through an electrolyzer, in which an application of a direct current voltage between an anode and a cathode after stopping operation of an electrolyzer causes a minute current (protective current) to flow from the anode to the cathode and thereby prevents reverse current. Furthermore, electrodes less susceptible to reverse current are developed. For example, a cathode for aqueous solution electrolysis is proposed in Patent Document 4, in which a mixed layer of metal nickel, nickel oxide and carbon atom is formed on the surface of an electrically conductive substrate with nickel surface and then a catalytic layer of electrode containing a metal(s) of platinum group or a oxide(s) of platinum group metal(s) is configured on this mixed layer. Moreover, Patent Document 5 proposes a method of reducing a reverse current in which the length and bending positions of a hose, which connects an outlet for cathode solution to a cathode solution recovery pipe, are optimized.

RELATED ART DOCUMENTS

Patent Documents

Patent Document 1: Japanese Unexamined Patent Application Publication No. S55-58383

Patent Document 2: Japanese Unexamined Patent Application Publication No. H8-144079

Patent Document 3: Japanese Unexamined Patent Application Publication No. S62-13589

Patent Document 4: Japanese Unexamined Patent Application Publication No. 2011-190534 (Japanese Patent No. 5006456)

Patent Document 5: Japanese Unexamined Patent Application Publication No. 2012-158775

SUMMARY OF THE INVENTION

Problems to be Solved by the Invention

The technologies proposed in Patent Documents 1 and 2 provide a certain effect as a measure against a reverse current generated when the operation of an electrolyzer is stopped, though those technologies are not necessarily satisfactory and remain to be further improved. Furthermore, if an electrolyzer is composed of a large number of elements, reverse currents each generated in the elements are superposed and the resulted reverse current higher than that generated by a complete short circuit can flow. In this case, the level of the cathode potential might reach to the level of oxygen gas ($O_2$) generation. With adopting the technology described in Patent Document 3, an application of a protective current from an anode to a cathode under such a situation induces production of hydrogen gas ($H_2$) in a cathode chamber and the produced hydrogen gas diffuses through an ion exchange membrane to an anode chamber and the resulted mixture of hydrogen ($H_2$) and oxygen ($O_2$) gasses might explode. On the other hand, it is a problem that an application of a higher protective current generates chlorine gas ($Cl_2$) though it prevents production of a detonating gas composed of hydrogen ($H_2$) and oxygen ($O_2$) gasses.

Furthermore, the cathode for aqueous solution electrolysis described in Patent Document 4 is excellent as a measure against a generated reverse current but is ineffective in prevention of reverse current. Moreover, the current state is that a reverse current cannot be prevented sufficiently even when the length and bending positions of a hose, which connects an outlet for cathode solution to a cathode solution recovery pipe, are optimized as in Patent Document 5.

Accordingly, the aim of the present invention is to provide a method of preventing reverse current flow through an ion exchange membrane electrolyzer, which method is capable of preventing a reverse current from being generated after stopping operation of the ion exchange membrane electrolyzer.

Means for Solving the Problems

The inventors have studied intensively to resolve the above-described problems and eventually gained the following idea. That is, the ideas described in Patent Documents 1 and 2 are that active materials in an anode chamber and a cathode chamber are eliminated by continuing supply of electrolytes to the anode and cathode chambers even after stopping operation of an electrolyzer, and the electromotive force to generate a reverse current is thereby reduced. However, in addition to reduction of an electromotive force to generate a reverse current, increase in the electrical resistance of a solution inside a piping structure can prevent reverse current. The inventors further studied intensively under such an idea and found that the above-described problems could be resolved according to the procedure described below when operation of an electrolyzer is stopped, and eventually completed the present invention.

Namely, the method of the present invention to prevent reverse current flow through an ion exchange membrane electrolyzer is a method of preventing reverse current flow through an ion exchange membrane electrolyzer comprising an anode chamber housing an anode, a cathode chamber housing a cathode, an anode solution-supplying manifold to feed anode solution to the anode chamber, and a cathode solution-supplying manifold to feed cathode solution to the cathode chamber, characterized by injecting, after stopping operation of the ion exchange membrane electrolyzer, a low electrical conductivity material with an electrical conductivity lower than that of the anode solution or the cathode solution to at least one of an anode solution-supplying pipe which supplies the anode solution to the anode solution-supplying manifold from an anode solution tank and a cathode solution-supplying pipe which supplies the cathode solution to the cathode solution-supplying manifold from a cathode solution tank.

The low electrical conductivity material is prefer to be water in the method of the present invention to prevent reverse current flow through an ion exchange membrane electrolyzer. Furthermore, in the method of the present invention to prevent reverse current flow through an ion exchange membrane electrolyzer, circulation of the cathode solution is terminated preferably after stopping operation of the ion exchange membrane electrolyzer. Moreover, in the method of the present invention to prevent reverse current flow through an ion exchange membrane electrolyzer, the contents in at least one of the anode solution-supplying pipe and the cathode solution-supplying pipe are preferably replaced with inert gas after stopping operation of the ion exchange membrane electrolyzer. Still furthermore, in the method of the present invention to prevent reverse current flow through an ion exchange membrane electrolyzer, when the ion exchange membrane electrolyzer has at least two cathode solution circulation pathways each comprising a manifold for discharging cathode solution and a cathode solution-supplying manifold, at least one of the cathode solution circulation pathways is electrically insulated from the other cathode solution circulation pathway(s) after stopping operation of the ion exchange membrane electrolyzer.

Effects of the Invention

According to the present invention, successfully provided is a method of preventing reverse current flow through an ion exchange membrane electrolyzer, which method is capable of preventing a reverse current from being generated after stopping operation of the ion exchange membrane electrolyzer.

BRIEF DESCRIPTION OF THE DRAWINGS

FIG. 1 is one exemplary schematic diagram showing an ion exchange membrane electrolyzer system composed of electrically interconnected two bipolar-type ion exchange membrane electrolyzers.

FIG. 2 shows one exemplary schematic diagram of a bipolar element.

FIG. 3 is one exemplary schematic diagram showing an ion exchange membrane electrolyzer system composed of electrically interconnected two monopolar-type ion exchange membrane electrolyzers.

FIG. 4 shows one exemplary schematic diagram of an anode element (a), and one exemplary schematic diagram of a cathode element (b).

FIG. 5 shows a schematic diagram showing a current measurement device.

MODE FOR CARRYING OUT THE INVENTION

The embodiments for carrying out the present invention will be described below in detail with reference to the drawings.

FIG. 1 is one exemplary schematic diagram showing an ion exchange membrane electrolyzer system composed of electrically interconnected two bipolar-type ion exchange membrane electrolyzers, while FIG. 2 is one exemplary schematic diagram showing a bipolar element. Taking the electrolysis of brine as an example, the method according to the present invention to prevent reverse current flow through an electrolyzer is described below. The ion exchange membrane electrolyzer 100 as shown in FIG. 1 is composed of the electrically interconnected electrolyzers A and B, which are surrounded by dashed lines in the drawing. Each of the electrolyzers A and B as shown in the drawing is composed of multiple bipolar elements 101 arranged side by side with an ion exchange membrane 102 interposed between them, and an end anode element 103 and an end cathode element 104 are located at each end of a line of multiple bipolar elements 101.

As shown in FIG. 2, a bipolar element 101 is integrally formed with an anode chamber 107 and a cathode chamber 110, in which an anode 105 is positioned at a distance from the anode surface of a partition 106 in anode chamber 107 and a cathode 108 is positioned at a distance from the cathode surface of a partition 109 in cathode chamber 110, and the anode 105 and the cathode 108 are held by holding ribs on anode side 111 attached on the anode surface of a partition 106 and holding ribs on cathode side 112 attached on the cathode surface on a partition 109, respectively.

Furthermore, a gas-liquid separating device on the anode-chamber side 113 and a gas-liquid separating device on the cathode-chamber side 114 are attached on the tops of the anode chamber 107 and the cathode chamber 110, respectively. In the illustrated example, a supplying section for anode solution 115 is provided at the bottom of the anode chamber 107 and a discharging section for anode solution 116 is provided to the gas-liquid separating device on the anode-chamber side 113, which discharging section for anode solution 116 is used to discharge an anode solution (brine) having a decreased concentration. Furthermore, a supplying section for cathode solution 117 is provided at the bottom of the cathode chamber 110 and a discharging section for cathode solution 118 is provided to the gas-liquid separating device on the cathode-chamber side 114, which discharging section for cathode solution 118 is used to discharge a cathode solution (sodium hydroxide solution) having an increased concentration.

According to the example shown in FIG. 1, the discharging section for anode solution 116 and the discharging section for cathode solution 118 of each of the plural bipolar elements 101 are connected to the manifold for discharging anode solution 119 and the manifold for discharging cathode solution 120, respectively. Furthermore, the anode solution-supplying manifold 121 to feed anode solution to the anode chamber 107 is connected to an anode solution supply tank, the brine supply tank 123, via the valve for supplying anode solution 122, while the cathode solution-supplying manifold 124 to feed cathode solution to the cathode chamber 110 is connected to a cathode solution tank, the circulating caustic soda tank 126, via the valve for supplying cathode solution 125. The anode solution recovered by the manifold for discharging anode solution 119 is processed at a dechlorination tower to remove dissolved chlorine gas ($Cl_2$), and then sent to the brine supply tank 123 after the salt concentration of the anode solution is adjusted. Furthermore, the cathode solution recovered by the manifold for discharging cathode solution 120 is sent to the circulating caustic soda tank 126 and a portion of the cathode solution circulates through the electrolyzer and a portion of the caustic soda (NaOH) is taken out as a product.

In the electrolysis of brine using the ion exchange membrane electrolyzer system 100 composed of electrically interconnected two bipolar-type ion exchange membrane electrolyzers as shown in FIG. 1, a reverse current is generated after stopping operation of the electrolyzer 100 by virtue of a driving force due to dissolved chlorine gas in the anode chamber 107 and hydrogen gas in the cathode chamber 110, as described above, and the reverse current flows through bipolar elements 101 and the laying pipe of each manifold, etc. Thus, in the method of the present invention to prevent reverse current flow, after stopping operation of the ion exchange membrane electrolyzer 100, a low electrical conductivity material with an electrical conductivity lower than that of the anode solution or the cathode solution is injected into at least one of an anode solution-supplying pipe 127 which supplies the anode solution to the anode solution-supplying manifold 121 from the brine supply tank 123 and a cathode solution-supplying pipe 128 which supplies the cathode solution to the cathode solution-supplying manifold 124 from the circulating caustic soda tank 126.

An electrical resistance of a solution in a piping structure is increased when a low electrical conductivity material with an electrical conductivity lower than that of an anode solution or a cathode solution is injected into the anode solution-supplying pipe 127 and/or the cathode solution-supplying pipe 128. This can reduce a reverse current flowing through an electric circuit formed between each bipolar element 101 having an internal electromotive force and the laying pipe of a manifold or the like after stopping operation of the electrolyzer 100. A reverse current is significant due to a high electromotive force while the solution temperature after stopping operation of the electrolyzer 100 and the concentration of active materials in the electrolytes are high. Therefore, the low electrical conductivity material is preferably injected into the anode solution-supplying pipe 127 and/or the cathode solution-supplying pipe 128 quickly after stopping operation.

As described above, a fresh electrolyte has been conventionally injected into the anode chamber 107 and the cathode chamber 110 after stopping operation of the electrolyzer 100 with the major aim to eliminate active materials in the residual electrolyte in a technology for a brine electrolyzer to prevent reverse current. In contrast, in the method of the present invention to prevent reverse current flow, a low electrical conductivity material with an electrical conductivity lower than that of an anode solution or a cathode solution is injected into at least one of the anode solution-supplying pipe 127 and the cathode solution-supplying pipe 128 to increase the electrical resistance of electrolytes in the laying pipes and to thereby reduce a reverse current. Furthermore, the injection of the low electrical conductivity material is excellent in that it can result in elimination of active materials ($Cl_2$, $H_2$), and decrease of the temperature at the electrolyzer.

In the method of the present invention to prevent reverse current flow, such a low electrical conductivity material is not particularly limited as long as the electrical conductivity of the material is lower than that of an anode solution or a cathode solution and the material can prevent a reverse current, and, for example, water can be preferably used. In case that water is used as a low electrical conductivity material, water with an electrical conductivity of $10^{-5}\Omega^{-1}cm^{-1}$ or less is particularly preferable and water such as pure water, deionized water, steam drain water from a boiler, steam condensed water from evaporation units for caustic soda and brine, and the like can be preferably used. Furthermore, in case that inert gas is used as a low electrical conductivity material, nitrogen gas ($N_2$), helium gas (He), argon (Ar) and the like can be preferably used. Pure water tanks 129a and 129b are installed in the example shown in FIG. 1 and pure water is injected into the anode solution-supplying pipe 127 and the cathode solution-supplying pipe 128, respectively.

In the method of the present invention to prevent reverse current flow, it is preferable to inject a low electrical conductivity material into both the anode solution-supplying pipe 127 and the cathode solution-supplying pipe 128, and it is acceptable to inject a low electrical conductivity material into either of them. For example, a low electrical conductivity material may be injected into the cathode solution-supplying pipe 128 alone and the anode solution-supplying pipe 127 may be supplied with an anode solution (brine) as usual to eliminate an active material ($Cl_2$). Furthermore, for the sake of elimination of an active material ($Cl_2$), it is also effective to supply an anode solution in the anode solution-supplying pipe 127 with 2 to 20 times more moles of sodium sulfite than the active material ($Cl_2$) and induce an oxidation-reduction reaction.

Furthermore, in the method of the present invention to prevent reverse current flow, circulation of cathode solution is preferably terminated after stopping operation of the electrolyzer 100. In operation of the electrolyzer 100, anode solution and cathode solution overflow from the discharging section for anode solution 116 and the discharging section for cathode solution 118, respectively. The overflown anode solution is removed out from the system to maintain the salt concentration of the anode solution, while a majority of the cathode solution is collected into the circulating caustic soda tank 126 and then used circulating into the cathode chamber 110 through the cathode solution-supplying manifold 124. Thus, an electric circuit is formed between each bipolar element 101 and the laying pipe of each manifold or the like, and leakage current flows. This is the cause of a reverse current when the operation of the electrolyzer 100 is stopped. Therefore, the reverse current due to the leakage current is prevented by stopping circulation of the cathode solution after stopping operation of the electrolyzer 100 to cut the electric circuit formed between each element 101 and the manifold for discharging cathode solution 120.

Moreover, in the method of the present invention to prevent reverse current flow, it is also preferable that the contents are replaced with inert gas such as $N_2$ gas after stopping operation of the electrolyzer 100 in at least one of the anode solution-supplying pipe 127 which supplies the anode solution to the anode solution-supplying manifold 121 from the brine supply tank 123 and the cathode solution-supplying pipe 128 which supplies the cathode solution to the cathode solution-supplying manifold 124 from the circulating caustic soda tank 126. The replacement with the inert gas in the anode solution-supplying pipe 127 and/or the cathode solution-supplying pipe 128 can prevent a reverse current due to a leakage current by cutting the electric circuit formed between each bipolar element 101 and the laying pipe of each manifold or the like.

Still furthermore, in the method of the present invention to prevent reverse current flow, in case that multiple electrolyzers (two electrolyzers, A and B, in an example shown in FIG. 1) are integrated in one electric circuit, it is preferable that the circulation pathway for cathode solution of at least one electrolyzer is electrically insulated from the circulation pathway(s) of the other electrolyzer(s) after stopping operation of the electrolyzer 100. Specifically, for example, the valves for supplying cathode solution 125a and 125b on the pathways shown in FIG. 1, which pathways supply a cathode solution from the external circulating caustic soda tank 126 to the cathode solution-supplying manifolds 124a and 124b, are closed and the electric interconnection is cut between the cathode solution circulation pathways of the electrolyzer A and B. This is particularly effective in case that the electrolyzer 100 is composed of a large number of elements 101 and in the illustrated example the electric potential difference generated between electrolyzers A and B and the laying pipe of each manifold or the like is divided into the electric potential difference generated between the electrolyzer A and the laying pipe of each manifold or the like and the electric potential difference generated between the electrolyzer B and the laying pipe of each manifold or the like and thus the generated reverse current can be reduced approximately by half.

FIG. 3 is one exemplary schematic diagram showing an ion exchange membrane electrolyzer system composed of electrically interconnected two monopolar-type ion exchange membrane electrolyzers, while FIG. 4 shows one exemplary schematic diagram of an anode element (a) and one exemplary schematic diagram of a cathode element (b). The ion exchange membrane electrolyzer 200 shown in FIG. 3 is composed of the electrically interconnected electrolyzers C and D, which are surrounded by dashed lines in the drawing. Each of the electrolyzers C and D shown in the drawing is composed of multiple anode elements 201 and cathode elements 202 arranged alternately with an ion exchange membrane 203 interposed between them, and half cathode elements 204 are located at both ends of a line of multiple elements.

As shown in FIG. 4, an anode element 201 has anodes 205 on the both surfaces, a cathode element 202 has cathodes 206 on the both surfaces, and each of them constitutes an anode chamber 207 and a cathode chamber 208 of the electrolyzers C and D shown in FIG. 3, respectively. Furthermore, a gas-liquid separating device on the anode-chamber side 209 and a gas-liquid separating device on the cathode-chamber side 210 are attached on the tops of the anode chamber 207 and the cathode chamber 208, respectively. Furthermore, in the illustrated example, a supplying section for anode solution 211 is provided at the bottom of the anode chamber 207 and a discharging section for anode solution 212 is provided to the gas-liquid separating device on the anode-chamber side 209, which discharging section for anode solution 212 is used to discharge an anode solution (brine) having a decreased concentration. A supplying section for cathode solution 213 is provided to the cathode chamber 208 and a discharging section for cathode solution 214 is provided to the gas-liquid separating device on the cathode-chamber side 210, which discharging section for cathode solution 214 is used to discharge a cathode solution (sodium hydroxide solution) having an increased concentration.

Furthermore, according to the example shown in FIG. 3, the discharging section for anode solution 212 of each anode element 201 and the discharging section for cathode solution 214 of each cathode element 202 are connected to the manifold for discharging anode solution 215 and the manifold for discharging cathode solution 216, respectively. Moreover, the anode solution-supplying manifold 217 to feed anode solution to the anode chamber 207 is connected to the brine supply tank 219 via the valve for supplying anode solution 218, while the cathode solution-supplying manifold 220 to feed cathode solution to the cathode chamber 208 is connected to the circulating caustic soda tank 222 via the valve for supplying cathode solution 221. The anode solution recovered by the manifold for discharging anode solution 215 is processed at a dechlorination tower to remove dissolved chlorine gas ($Cl_2$), and then sent to the brine supply tank 219 after the salt concentration of the anode solution is adjusted. Furthermore, the cathode solution recovered by the manifold for discharging cathode solution 216 is sent to the circulating caustic soda tank 222 and some of the cathode solution is circulated through the electrolyzer and the other of the caustic soda (NaOH) is taken out as a product.

In the electrolysis of brine using the ion exchange membrane electrolyzer 200 composed of electrically interconnected two monopolar-type ion exchange membrane electrolyzers as shown in FIG. 3, a reverse current is generated by virtue of a driving force due to dissolved chlorine gas ($Cl_2$) in the anode chamber 207 and hydrogen gas ($H_2$) in the cathode chamber 208, as seen in the bipolar-type ion exchange membrane electrolyzer, and the reverse current flows through anode elements 201, cathode elements 202, and each laying pipe of a manifold, etc. Thus, in the method of the present invention to prevent reverse current flow, after stopping operation of the electrolyzer 200, a low electrical conductivity material with an electrical conductivity lower than that of the anode solution or the cathode solution is injected into at least one of an anode solution-supplying pipe 223 which supplies the anode solution to the anode solution-supplying manifold 217 from the brine supply tank 219 and a cathode solution-supplying pipe 224 which supplies the cathode solution to the cathode solution-supplying manifold 220 from the circulating caustic soda tank 222.

An electrical resistance of a solution in a piping structure is increased when a low electrical conductivity material with an electrical conductivity lower than that of an anode solution or a cathode solution is injected into the anode solution-supplying pipe 223 and/or the cathode solution-supplying pipe 224 and the resulted electrical resistance can reduce a reverse current. A reverse current is significantly generated due to a high electromotive force while the solution temperature after stopping operation of the electrolyzer 200 and the concentration of active materials in the electrolytes are high. Therefore, also in this embodiment, the low electrical conductivity material is preferably injected into the anode solution-supplying pipe 223 and/or the cathode solution-supplying pipe 224 quickly after stopping operation. Furthermore, also in this embodiment, the injection of the low electrical conductivity material can result in elimination of active materials ($Cl_2$, $H_2$), and also decrease of the temperature at the electrolyzer.

Also in this embodiment, such a low electrical conductivity material is not particularly limited as long as the electrical conductivity of the material is lower than that of an anode solution or a cathode solution and the material can prevent a reverse current, and, for example, water can be preferably used. In case that water is used as a low electrical conductivity material, water with an electrical conductivity of $10^{-5}\Omega^{-1}cm^{-1}$ or less is preferable and water such as pure water, deionized water, steam drain water from a boiler, steam condensed water from evaporation units for caustic soda and brine, and the like can be preferably used. Furthermore, in case that inert gas is used as a low electrical conductivity material, nitrogen gas ($N_2$), helium gas (He), argon (Ar) and the like can be preferably used. Pure water tanks 225a and 225b installed in the example shown in FIG. 3 inject pure water to the anode solution-supplying pipe 223 and the cathode solution-supplying pipe 224, respectively.

Also in this embodiment, it is preferable to inject a low electrical conductivity material into both the anode solution-supplying pipe 223 and the cathode solution-supplying pipe 224, and it is acceptable to inject a low electrical conductivity material into either of them. For example, a low electrical conductivity material may be injected into the cathode solution-supplying pipe 224 alone and the anode solution-supplying pipe 223 may be supplied with an anode solution (brine) to eliminate an active material ($Cl_2$). Furthermore, for the sake of elimination of an active material ($Cl_2$), it is also effective to supply an anode solution with 2 to 20 times more moles of sodium sulfite than the active material ($Cl_2$) and induce an oxidation-reduction reaction.

Furthermore, also in this embodiment, circulation of cathode solution is preferably terminated after stopping operation of the electrolyzer 200. In operation of the electrolyzer 200, anode solution and cathode solution overflow from the discharging section for anode solution 212 and the discharging section for cathode solution 214, respectively. The overflown anode solution is removed out from the system to maintain the salt concentration of the anode solution, while a majority of the cathode solution is collected into the circulating caustic soda tank 222 and then used circulating into the cathode chamber 208 through the cathode solution-supplying manifold 220. Thus, an electric circuit is formed between a cathode element 202 and the laying pipe of each manifold or the like, and leakage current flows. This is the cause of a reverse current when the operation of the electrolyzer 200 is stopped. Therefore, the reverse current due to the leakage current is prevented by stopping circulation of the cathode solution after stopping operation of the electrolyzer 200 to cut the electric circuit formed between each cathode element 202 and the manifold for discharging cathode solution 216.

Moreover, also in this embodiment, the contents may be replaced with inert gas such as $N_2$ gas after stopping operation of the electrolyzer 200 in at least one of the anode solution-supplying pipe 223 which supplies the anode solution to the anode solution-supplying manifold 217 from the brine supply tank 219 and the cathode solution-supplying pipe 224 which supplies the cathode solution to the cathode solution-supplying manifold 220 from the circulating caustic soda tank 222. The replacement with the inert gas in the anode solution-supplying pipe 223 and/or the cathode solution-supplying pipe 224 can prevent a reverse current due to a leakage current by cutting the electric circuit formed among an anode element 201, a cathode element 202 and the laying pipe of each manifold or the like.

Still furthermore, also in this embodiment, in case that multiple electrolyzers (two electrolyzers, C and D in an example shown in FIG. 3) are integrated in one electric circuit, it is preferable that the circulation pathway for cathode solution of at least one electrolyzer is electrically insulated from the circulation pathway(s) of the other electrolyzer(s). Specifically, for example, the valves for supplying cathode solution 221a and 221b on the pathways shown in FIG. 3, which pathways supply a cathode solution from the external circulating caustic soda tank 222 to the cathode solution-supplying manifolds 220a and 220b, are closed and the electric interconnection is cut between the cathode solution circulation pathways of the electrolyzer C and of the electrolyzer D. This is particularly effective in case that the electrolyzer 200 is composed of a large number of each elements 201 and 202, and the electric potential difference generated between electrolyzers C and D and the laying pipe of each manifold or the like is divided into the electric potential difference generated between the electrolyzer C and the laying pipe of each manifold or the like and the electric potential difference generated between the electrolyzer D and the laying pipe of each manifold or the like and thus the generated reverse current can be reduced approximately by half.

The method of the present invention to prevent reverse current flow has been described so far in cases of the electrolyzer 100 composed of electrically interconnected two bipolar-type ion exchange membrane electrolyzers and the electrolyzer 200 composed of electrically interconnected two monopolar-type ion exchange membrane electrolyzers. In the method of the present invention to prevent reverse current flow, the only thing that is important is that a low electrical conductivity material is injected into at least one of the anode chamber and the cathode chamber after operation of an ion exchange membrane electrolyzer is stopped and compositions other than this are not particularly limited. For example, known and conventionally used electrodes can be adopted as an anode and a cathode. Furthermore, conditions adopted to operate an electrolyzer are not particularly limited and general and commonly used conditions can be applied.

There is some concern in the method of the present invention to prevent reverse current flow that injection of pure water as a low electrical conductivity material into anode chambers 107 and 207 and/or cathode chambers 110 and 208 results in swelling of ion exchange membranes 102 and 203, which in turn leads to wrinkling of ion exchange membranes 102 and 203 and eventually gives mechanical damage to the ion exchange membranes. However, the durability of a perfluoro cationic exchange membrane using a carboxylic acid, sulfonic acid or a combined acid thereof as an ion exchange group commonly used in a current mode of the ion exchange membrane-type electrolysis of brine is improving day by day and such a concern has been wiped away recently and the membrane is usable without any problems. For example, F8020, F8020SP and F8080 produced by Asahi Glass Co., Ltd; N2010, N2030 and N2040 produced by Du Pont Kabushiki Kaisha; F4401, F4403 and F6801 produced by Asahi kasei Corporation can be preferably used. Moreover, it is effective for prevention of wrinkles in the membrane to add a pressure of 400 to 600 mm $H_2O$ to a cathode chamber after stopping operation and press the membrane toward an anode chamber.

Furthermore, when operation of an electrolyzer is stopped using the method of the present invention to prevent reverse current flow, a low electrical conductivity material may be injected into anode chambers 107 and 207 and/or cathode chambers 110 and 208 only during the time period when the effect of reverse current is large. This is because it is sometimes difficult to adjust the concentration of the anode solution and/or the cathode solution during the restart of an electrolyzer. Therefore, in case that an electrolyzer is stored, it is preferable that the above-described method of the present invention to prevent reverse current flow is applied after stopping operation of the electrolyzer; the contents of anode chambers and cathode chambers are replaced again with anode solution and cathode solution, respectively, after the effect of reverse current is diminished; and the electrolyzer is eventually stored.

EXAMPLES

The method of the present invention to prevent reverse current flow through an ion exchange membrane electrolyzer will be described below in details by means of examples.

The values of voltage and reverse current at each manifold were measured in each case of the Conventional Example and Example. The electrolyzer n-BiTAC896 (produced by Chlorine Engineers Corp., Ltd) comprising two electrolyzers arranged in series was adopted as a type of electrolyzer composed as shown in FIG. 1.

Reverse current was determined with the current measurement device 300 composed as shown in FIG. 5, in which the device is integrated in each of the manifold for discharging anode solution 119, the manifold for discharging cathode solution 120, the anode solution-supplying manifold 121 and the cathode solution-supplying manifold 124. The value of electric current was measured at the points after the anode and cathode solutions discharged from each element 101 in the electrolyzer 100 were merged at the manifold for discharging anode solution 119 and the manifold for discharging cathode solution 120, respectively, or the points before fresh anode and cathode solutions were distributed at the anode solution-supplying manifold 121 and the cathode solution-supplying manifold 124, respectively, in which two mesh-type platinum electrodes 301 were placed at each of the points where the anode and cathode solutions passed through and were connected with an ammeter 302. The laying pipes 303 between the platinum electrodes 301 were made of PVC and such pipes were used for insulation. In the laying pipes 304 on both sides of the current measurement device 301, the pipes for measurement by the anode were made of titanium and the pipes for measurement by the cathode were made of nickel. Furthermore, the arrows in the drawings indicate the directions of anode solution flow and cathode solution flow.

Conventional Example

As a process after stopping operation of the electrolyzer 100, brine with a concentration of 300 g/L at 60° C. was supplied at a flow rate of 0.25 $m^3$/h/element into the anode chambers 107 through the anode solution-supplying manifold 121. Furthermore, sodium hydroxide (NaOH) solution with a concentration of 30% by mass at 85° C. was supplied at a flow rate of 0.25 $m^3$/h/element into the cathode chambers 110 through the cathode solution-supplying manifold 124.

The electric potential and reverse current were measured three hours and six hours after stopping operation at the anode solution-supplying manifold 121, the manifold for discharging anode solution 119, the cathode solution-supplying manifold 124 and the manifold for discharging cathode solution 120. The obtained results are presented in Table 1 along with the conditions after stopping operation of the electrolyzer 100. Here, each value of reverse current represents the maximum of the sums of electrical currents each measured at each manifold. At 3 hours after stopping operation, the cell voltage was 1.6 V, the anode solution discharged from the anode chambers 107 was brine with a concentration of 300 g/L at 65° C., and the cathode solution discharged from the cathode chambers 110 was sodium hydroxide solution with a concentration of 28% by mass at 65° C. Moreover, at 6 hours after stopping operation, the cell voltage was 1.6 V, the anode solution discharged from the anode chambers 107 was brine with a concentration of 300 g/L at 40° C., and the cathode solution discharged from the cathode chambers 110 was sodium hydroxide solution with a concentration of 28% by mass at 40° C.

Example

As a process after stopping operation of the electrolyzer 100, pure water at 25° C. (electrical conductivity: $10^{-5}\Omega^{-1}cm^{-1}$ or less) was injected at a flow rate of 0.25 $m^3$/h/element into the anode chambers 107 from the anode solution-supplying pipe 127 through the anode solution-supplying manifold 121. Furthermore, water at 25° C. (electrical conductivity: $10^{-5}\Omega^{-1}cm^{-1}$ or less) was injected at a flow rate of 0.25 $m^3$/h/element into the cathode solution-supplying manifold 124 from the cathode solution-supplying pipe 128. The supply of pure water to the cathode solution-supplying manifold 124 was stopped after the content of the cathode solution-supplying manifold 124 was replaced with pure water.

As measured in the Conventional Example, the electric potential and reverse current were measured three hours and six hours after stopping operation at the anode solution-supplying manifold 121, the manifold for discharging anode solution 119, the cathode solution-supplying manifold 124 and the manifold for discharging cathode solution 120. The obtained results are presented in Table 1 along with the conditions after stopping operation of the electrolyzer 100. At 3 hours after stopping operation, the cell voltage was 1.3 V, the anode solution discharged from the anode chambers 107 was brine with a concentration of 14 g/L at 40° C., and little volume of cathode solution was discharged from the cathode chambers 110. Moreover, at 6 hours after stopping operation, the cell voltage was 1.3 V, the anode solution discharged from the anode chambers 107 was brine with a concentration of 1 g/L at 30° C., and little volume of cathode solution was discharged from the cathode chambers 110. Since the anode solution-supplying manifold and the cathode solution-supplying manifold were supplied with pure water and subsequently little volume of solution flew into the manifold for discharging cathode solution, hereby, the electric potentials at these manifolds were unmeasurable.

TABLE 1

| | | Conventional Example | | Example | |
|---|---|---|---|---|---|
| Time after stopping operation (hours) | | 3 | 6 | 3 | 6 |
| Discharged solution from the anode chambers | NaCl concentration (g/L) | 300 | 300 | 14 | 1 |
| | Temperature (° C.) | 65 | 40 | 40 | 30 |
| Discharged solution from the cathode chambers | NaOH concentration (% by mass) | 28 | 28 | — | — |
| | Temperature (° C.) | 65 | 40 | — | — |
| Voltage at the anode solution-supplying manifold (V) | | 9.3 | 9.3 | — | — |
| Voltage at the manifold for discharging anode solution (V) | | 44.3 | 30.5 | 25.4 | 25.5 |
| Voltage at the cathode solution-supplying manifold (V) | | 13.3 | 13.3 | — | — |
| Voltage at the manifold for discharging cathode solution (V) | | 29.6 | 30.4 | — | — |
| Reverse current (Maximum) (A) | | 63.3 | 40.1 | 0.8 | 0.1 |

Table 1 indicates that a reverse current after stopping operation of an electrolyzer can be dramatically reduced according to the method of the present invention to prevent reverse current flow.

DESCRIPTION OF SYMBOLS

100 Bipolar-type ion exchange membrane electrolyzer
101 Bipolar element
102 Ion exchange membrane
103 End anode element
104 End cathode element
105 Anode
106 Anode surface of a partition
107 Anode chamber
108 Cathode
109 Cathode surface of a partition
110 Cathode chamber
111 Holding rib on anode side
112 Holding rib on cathode side
113 Gas-liquid separating device on the anode-chamber side
114 Gas-liquid separating device on the cathode-chamber side
115 Supplying section for anode solution
116 Discharging section for anode solution
117 Supplying section for cathode solution
118 Discharging section for cathode solution
119 Manifold for discharging anode solution
120 Manifold for discharging cathode solution
121 Anode solution-supplying manifold
122 Valve for supplying anode solution
123 Brine supply tank
124 Cathode solution-supplying manifold
125 Valve for supplying cathode solution
126 Circulating caustic soda tank
127 Anode solution-supplying pipe
128 Cathode solution-supplying pipe
129 Pure water tank
200 Monopolar-type ion exchange membrane electrolyzer
201 Anode element
202 Cathode element
203 Ion exchange membrane
204 Half cathode element
205 Anode
206 Cathode
207 Anode chamber
208 Cathode chamber
209 Gas-liquid separating device on the anode-chamber side
210 Gas-liquid separating device on the cathode-chamber side
211 Supplying section for anode solution
212 Discharging section for anode solution
213 Supplying section for cathode solution
214 Discharging section for cathode solution
215 Manifold for discharging anode solution
216 Manifold for discharging cathode solution
217 Anode solution-supplying manifold
218 Valve for supplying anode solution
219 Brine supply tank
220 Cathode solution-supplying manifold
221 Valve for supplying cathode solution
222 Circulating caustic soda tank
223 Anode solution-supplying pipe
224 Cathode solution-supplying pipe
225 Pure water tank
300 Current measurement device
301 Platinum electrode
302 Ammeter
303, 304 Laying pipes

The invention claimed is:

1. A method of preventing reverse current flow through an ion exchange membrane electrolyzer comprising an anode chamber housing an anode, a cathode chamber housing a cathode, an anode solution-supplying manifold to feed anode solution to the anode chamber, and a cathode solution-supplying manifold to feed cathode solution to the cathode chamber,
characterized by injecting, after stopping operation of the ion exchange membrane electrolyzer, a low electrical conductivity material having an electrical conductivity lower than that of the anode solution to at least an anode solution-supplying pipe which supplies the anode solution to the anode solution-supplying manifold from an anode solution tank, wherein
the anode solution-supplying manifold is different from the cathode solution-supplying manifold.

2. The method of preventing reverse current flow through an ion exchange membrane electrolyzer according to claim 1, wherein the low electrical conductivity material is pure water.

3. The method of preventing reverse current flow through an ion exchange membrane electrolyzer according to claim 1, wherein circulation of the cathode solution is terminated after stopping operation of the ion exchange membrane electrolyzer.

4. The method of preventing reverse current flow through an ion exchange membrane electrolyzer according to claim 1, wherein the contents in at least one of the anode solution-supplying pipe and the cathode solution-supplying pipe are replaced with inert gas after stopping operation of the ion exchange membrane electrolyzer.

5. The method of preventing reverse current flow through an ion exchange membrane electrolyzer according to claim 1, wherein the ion exchange membrane electrolyzer has at least two cathode solution circulation pathways each comprising a manifold for discharging cathode solution and a cathode solution-supplying manifold, and wherein at least one of the cathode solution circulation pathways is electrically insulated from the other cathode solution circulation pathway(s) after stopping operation of the ion exchange membrane electrolyzer.

6. The method of preventing reverse current flow through an ion exchange membrane electrolyzer according to claim 2, wherein circulation of the cathode solution is terminated after stopping operation of the ion exchange membrane electrolyzer.

7. The method of preventing reverse current flow through an ion exchange membrane electrolyzer according to claim 2, wherein the contents in at least one of the anode solution-supplying pipe and the cathode solution-supplying pipe are replaced with inert gas after stopping operation of the ion exchange membrane electrolyzer.

8. The method of preventing reverse current flow through an ion exchange membrane electrolyzer according to claim 3, wherein the contents in at least one of the anode solution-supplying pipe and the cathode solution-supplying pipe are replaced with inert gas after stopping operation of the ion exchange membrane electrolyzer.

9. The method of preventing reverse current flow through an ion exchange membrane electrolyzer according to claim 2, wherein the ion exchange membrane electrolyzer has at least two cathode solution circulation pathways each comprising a manifold for discharging cathode solution and a cathode solution-supplying manifold, and wherein at least one of the cathode solution circulation pathways is electrically insulated from the other cathode solution circulation pathway(s) after stopping operation of the ion exchange membrane electrolyzer.

10. The method of preventing reverse current flow through an ion exchange membrane electrolyzer according to claim 3, wherein the ion exchange membrane electrolyzer has at least two cathode solution circulation pathways each comprising a manifold for discharging cathode solution and a cathode solution-supplying manifold, and wherein at least one of the cathode solution circulation pathways is electrically insulated from the other cathode solution circulation pathway(s) after stopping operation of the ion exchange membrane electrolyzer.

11. The method of preventing reverse current flow through an ion exchange membrane electrolyzer according to claim 4, wherein the ion exchange membrane electrolyzer has at least two cathode solution circulation pathways each comprising a manifold for discharging cathode solution and a cathode solution-supplying manifold, and wherein at least one of the cathode solution circulation pathways is electrically insulated from the other cathode solution circulation pathway(s) after stopping operation of the ion exchange membrane electrolyzer.

12. A method of preventing reverse current flow through an ion exchange membrane electrolyzer comprising an anode chamber housing an anode, a cathode chamber housing a cathode, an anode solution-supplying manifold to feed anode solution to the anode chamber, and a cathode solution-supplying manifold to feed cathode solution to the cathode chamber, the method comprising:
  operating the ion exchange membrane electrolyzer by feeding the anode solution to the anode chamber and feeding the cathode solution to the cathode chamber;
  stopping operation of the ion exchange membrane electrolyzer; and
  injecting, after stopping operation of the ion exchange membrane electrolyzer, a low electrical conductivity material having an electrical conductivity lower than that of the anode solution to at least an anode solution-supplying pipe which supplies the anode solution to the anode solution-supplying manifold from an anode solution tank, wherein
  the anode solution-supplying manifold is different from the cathode solution-supplying manifold.

* * * * *